Dec. 9, 1969     W. A. LE MARR     3,482,329
SELF-TRAINING DEVICE FOR STUDENTS

Filed Jan. 15, 1968     5 Sheets-Sheet 1

INVENTOR.
WESLEY ALBERT LeMARR

BY

ATTORNEYS

Dec. 9, 1969 W. A. LE MARR 3,482,329
SELF-TRAINING DEVICE FOR STUDENTS
Filed Jan. 15, 1968 5 Sheets-Sheet 4

INVENTOR.
WESLEY ALBERT LeMARR
BY
ATTORNEYS

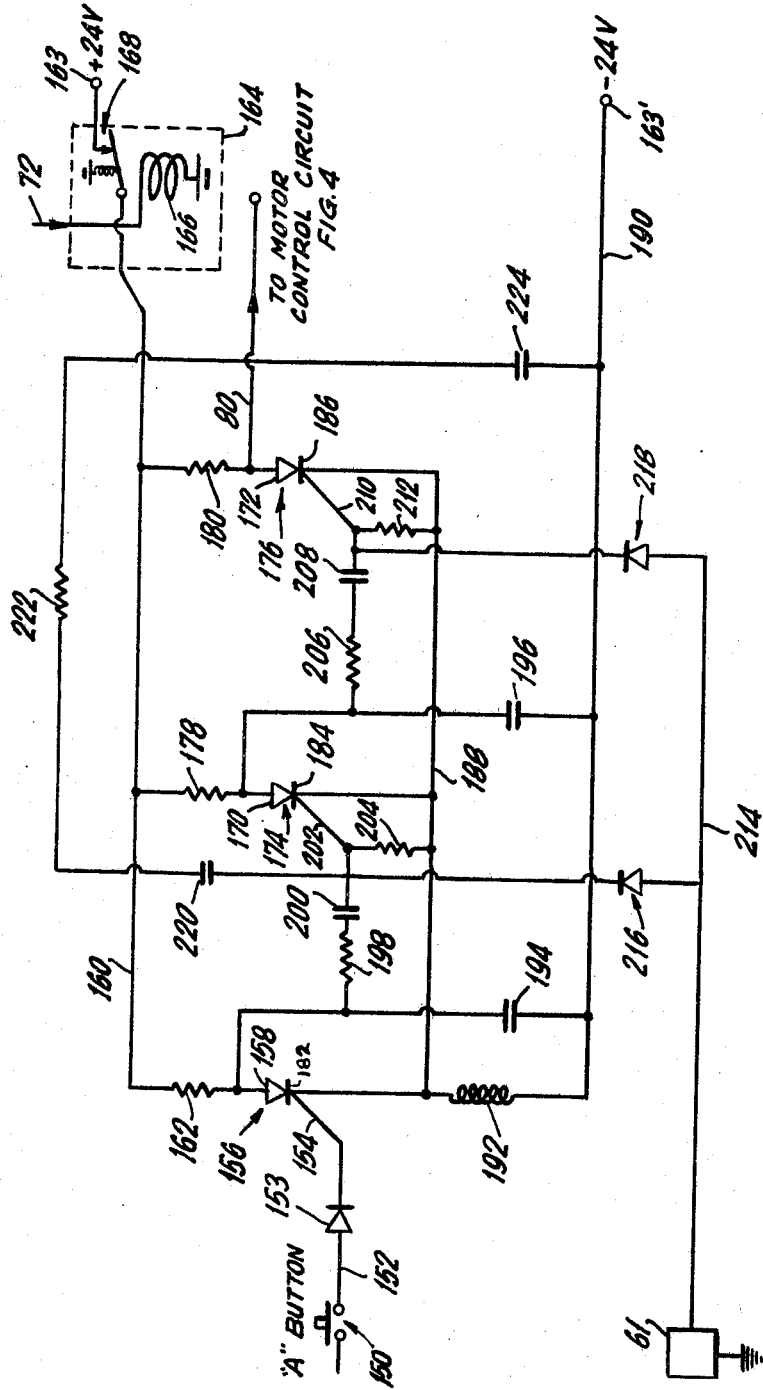

United States Patent Office

3,482,329
Patented Dec. 9, 1969

3,482,329
SELF-TRAINING DEVICE FOR STUDENTS
Wesley Albert Le Marr, New York, N.Y., assignor to Pro-Gramo, Inc., New York, N.Y.
Filed Jan. 15, 1968, Ser. No. 697,737
Int. Cl. G09b 7/06
U.S. Cl. 35—9
11 Claims

ABSTRACT OF THE DISCLOSURE

A self-teaching device having an advance bar, a review bar and a plurality of response bars such as A, B, C and D. Upon successive pressings of the advance bar, there are visually displayed successive frames from a film strip which presents a problem ending with a question having as a correct answer either: (1) A, B, C or D; or (2) true or false. If the student presses one of the bars corresponding to the wrong answer, a corresponding response frame is displayed which explains particularly why the chosen response is wrong. If the correct response bar is pressed, a correct score counter is advanced and a correct answer frame is displayed which explains the correctness of the student's choice. Depressing the review bar redisplays the question answered and depressing the advance bar will display the next problem and question.

BACKGROUND OF THE INVENTION

This invention is directed to self-teaching devices and particularly to improved apparatus of the multiple-choice response and/or true-false type(s).

A principal object of the invention is to improve the efficiency of teaching students with the aid of self-training apparatus.

More particularly, it is an object of this invention to provide apparatus which speeds up the learning process for average and advanced students by explaining incorrect answers with a particular logic as governed by the particular wrong answer chosen by the student.

Educational research has demonstrated that the state of knowledge of a student can quickly and accurately be determined by multiple-choice type and/or true-false type answers to carefully prepared questions. Such questions are followed by a number of presented answers which are cleverly worded so that all seem correct but, in fact, only one is correct. With proper questions, guessing is disastrous. Very important is the aspect that each of the wrong answers foretells a particular state of misinformation or ignorance. The efficacy of multiple-choice and true-false type questions is now recognized not only for final examinations in primary and secondary schools and college, but they are now also generally used in state bar examinations such as law and medicine, where licensed misinformed professionals could greatly harm the public.

As conceived, this invention can conserve the student's available time when he chooses to avoid: (A) Reading undesired explanations as to why his answer is correct by promptly requesting a new question after a correct score is registered and (B) tiring corrective explanations which are not specifically directed to the misinformation actually displayed by the student.

SUMMARY OF THE INVENTION

According to the invention, there is provided a self-training device which comprises a movable film strip having a question frame and a plurality of response frames, motor means for longitudinally moving the film strip, an aperture in the question frame, an aperture in the response frames, the response apertures being spaced from each other laterally across the film strip and from the question frame aperture, a question aperture detector and a plurality of response aperture detectors in juxtaposition to said film strip and arranged in a lateral direction thereacross, each aperture detector being positioned in the path of one of the apertures as the film strip is moved longitudinally by the motor means, an advance switch, a plurality of response switches, a first circuit coupled to the question aperture detector and to the advance switch for activating the motor means to move the film strip longitudinally until the question frame aperture is detected by the question frame aperture detector, a memory response circuit for each of the response switches which is coupled to one of the response aperture detectors for activating the motor means when a selected response switch is closed to move the film strip longitudinally until the aperture in the response frame corresponding to the selected response switch is detected by its corresponding response frame detector, a correct score aperture in a selected one of the response frames, a correct score aperture detector which coacts with the correct score aperture after the response switch corresponding to the response frame having the correct score aperture is activated and a correct score means coupled to said correct score detector.

Other objects and features of the present invention will be set forth or apparent in the following description and claims and illustrated in the accompanying drawings which disclose by way of example and not by way of illustrations, in a limited number of embodiments, the principle of the invention and implementations of the inventive concept.

DESCRIPTION OF THE DRAWINGS

In the drawings, in which like reference numbers designate like components in the several views:

FIG. 5 is a schematic circuit diagram of a memory circuit portion of FIG. 3 which is associated with each of the RESPONSE bars.

DESCRIPTION OF A PREFERRED EMBODIMENT OF THE INVENTION

Figure 1:
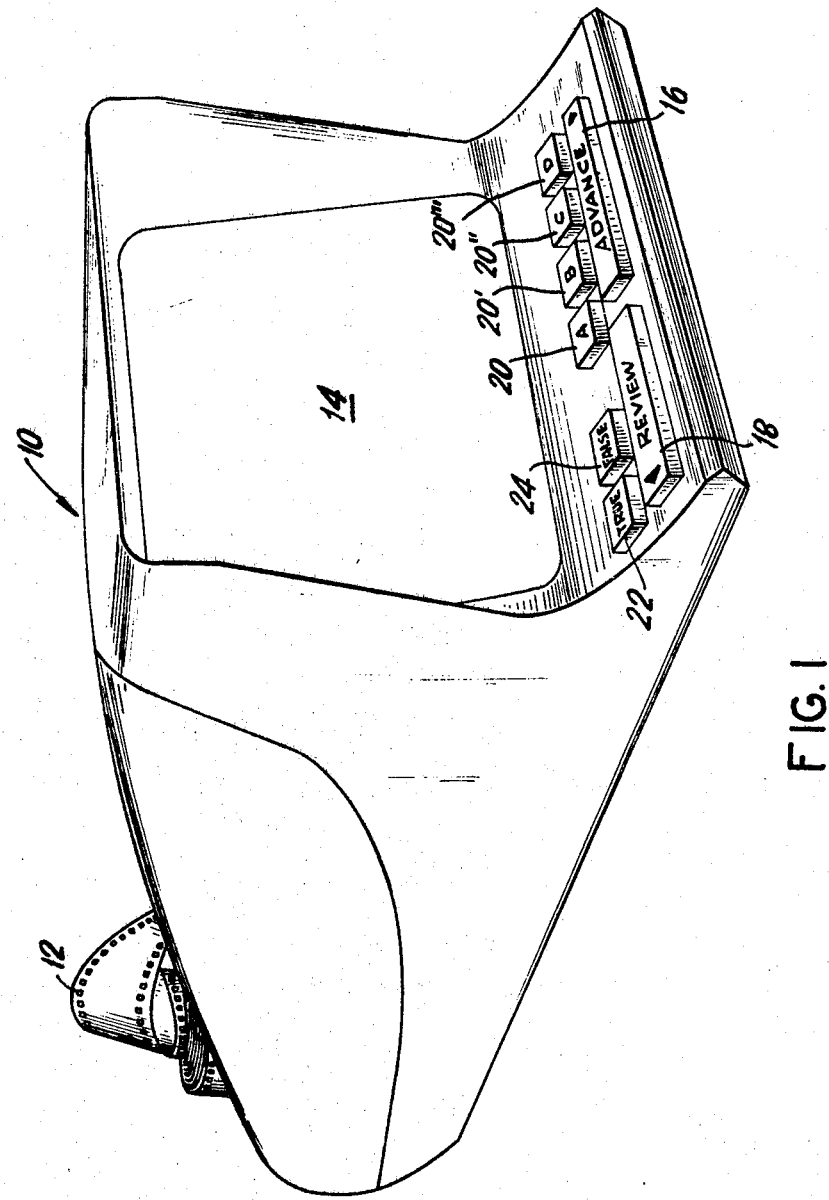
FIG. 1 is a perspective view of a self-training device according to the invention.

As shown in FIG. 1, a self-training device 10 comprises a film strip 12, and a viewing screen 14 upon which is projected selected individual frames of the film strip 12 by a conventional projection lamp (not shown). At the front console position of the device 10 is an ADVANCE bar 16, a REVIEW bar 18, and a plurality of RESPONSE bars 20, 20' and 20'' and 20''', marked "A," "B," "C" and "D." Also, the console of the device 10 may optionally have two additional bars 22, 24, which are labelled TRUE and FALSE, respectively, when it is desired for the device 10 to be programmed for true and false questions as well as for multiple choice answer type questions.

Figure 2:
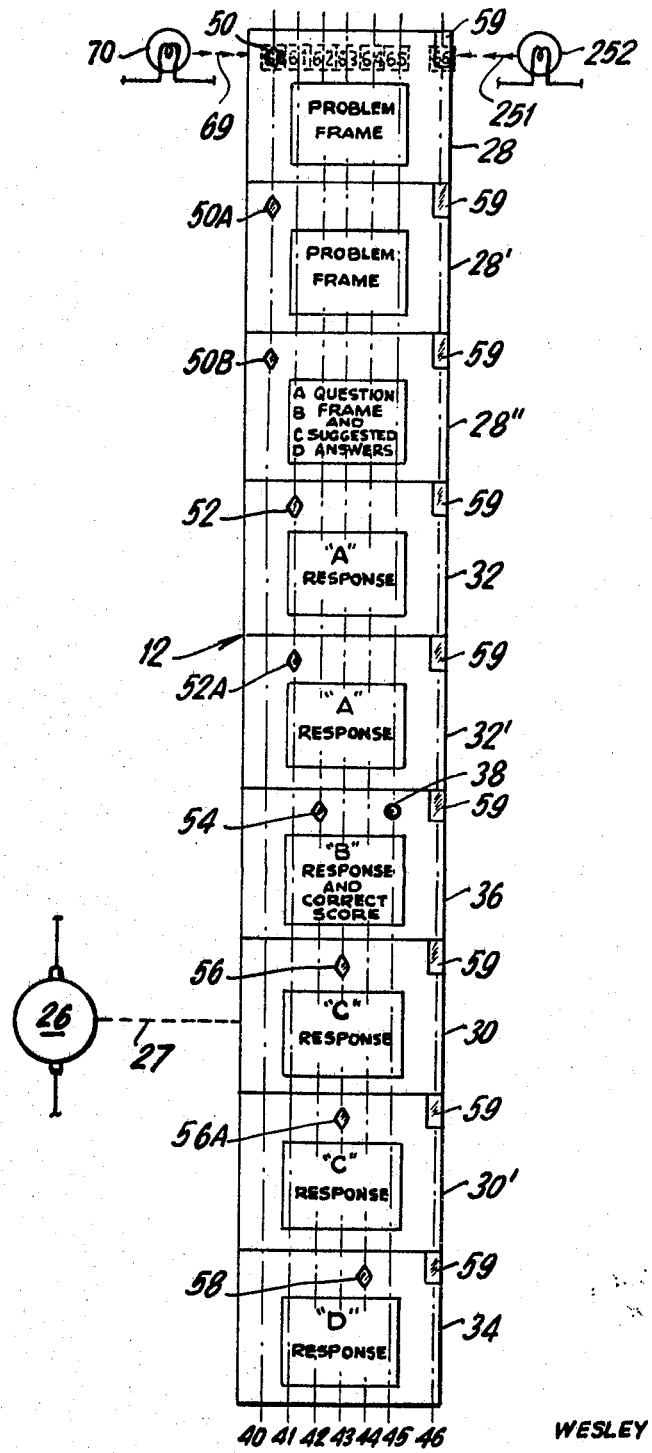
FIG. 2 is a diagram showing the film strip employed in the device of FIG. 1.

The details of the film strip 12 are shown in FIG. 2. Upon depressing the ADVANCE bar 16, a motor 26 and drive 27 moves the film strip 12 by conventional mechanism (not shown) to frame 28 for projection thereof upon screen 14. Such problem frame 28 presents the problem situation to be read by the student, and such problem may take one, two or three or more frames. As shown in FIG. 2, the presented problem requires two problem frames 28 and 28'. After the student completely reads the problem on frame 28, he again depresses the ADVANCE bar 16 so that the problem frame 28' is projected upon screen 14. After the problem is completely presented, a question is propounded and four possible answers are presented as "A," "B," "C" and "D?" Such possible answers may be presented on a separate question frame, 28'', or they may be presented after the problem on either frame 28' or 28.

The student then mentally chooses one of the answers "A," "B," "C" or "D" and thereafter presses the corresponding bar marked "A," "B," "C" or "D," namely, one of the bars 20, 20', 20'' or 20'''. Motor 26 is then energized and information on a frame corresponding to the answer chosen will be projected upon screen 14. For instance, if the student chooses "C" as the correct answer, which we will assume is incorrect, motor 26 will move film strip 12 so that frame 30 is projected on the screen 14. Frame 30 will explain why answer "C" is not correct. Such explanation may take more than one frame so that after the student finishes reading the information on frame 30, he depresses the ADVANCE bar 16 so that frame 30' will be projected on screen 14. If the student wishes to review the question and the problem, he depresses the REVIEW bar 18 and the motor 26 then moves the film strip 12 in the reverse direction until frame 28'' appears on the screen 14. A second pressing of the REVIEW bar 18 will move the film strip backwards until frame 28' is shown on the screen 14. Another depression of the REVIEW bar 18 will cause the film strip to step backwards to display frame 28. Thereafter the ADVANCE bar 14 can be depressed to repeat the cycle hereinabove described.

If the RESPONSE bars "A" or "D" are depressed to signify the student's incorrect answer to the propounded question, either frame 32 or 34, respectively, will be displayed upon the screen 14. It is to be noted that, in FIG. 2, the explanation of incorrectness of answer "A" requires two frames, 32 and 32', while the incorrect answer chosen by "D" requires but one explanational frame 34.

As shown in FIG. 2, there are seven longitudinal aperture columns 40, 41, 42, 43, 44, 45, and 46. In the first aperture column 40, there is positioned diamond shaped apertures 50, 50A and 50B in frames which present the details of the problem, the question and the suggested four answers.

Aperture column 41 has disposed therein diamond shaped apertures 52 and 52A positioned in frames 32 and 32' which contain instructional information as to why the "A" response is incorrect.

In aperture column 42 is positioned a single diamond shaped aperture 54 in frame 36, the latter frame containing information as to why the answer "B" is correct, and optionally, why answers "A," "C" and "D" are incorrect. Such "B" response may optionally require more than one frame.

Aperture column 43 has disposed therein diamond shaped apertures 56 and 56A in frames 30 and 30' which contain information as to why the chosen answer "C" is incorrect.

Aperture column 44 has positioned therein diamond shaped aperture 58 in frame 34 which contains the reasons why the chosen answer "D" is incorrect.

If the student chooses a correct answer, for instance "B," not only will frame 36 be moved into projection position upon screen 14 by the action of aperture 54, but additionally an aperture 38 in aperture column 45 will cause a counter circuit and mechanism 26 (see FIG. 3) to advance and thereby keep the student's score of the correct answers.

In aperture column 46 there is positioned in each frame an aperture 59 for the "frame sinc" control as to be explained hereinafter.

As illustrated in FIG. 2, the teaching device 10 incorporates a plurality of photoelectric cells 60, 61, 62, 63, 64, 65 and 66 positioned transversely across the film strip 12, one each of the photoelectric cells 60 to 66 being positioned along aperture columns 40 to 46, respectively. Such photoelectric cells can be of the voltage generating type, for instance, model SAR–10–08 BPL–R–11 as manufactured by the International Rectifier Company. In FIG. 2, the film strip 12 has been moved by motor 26 to a stopped position as controlled by light 69 passing from a source 70 through the transparent aperture 50 and upon photoelectric cell 60. Source 70 supplies light for all of the photocells 60 to 65 but not 66.

Figure 3:
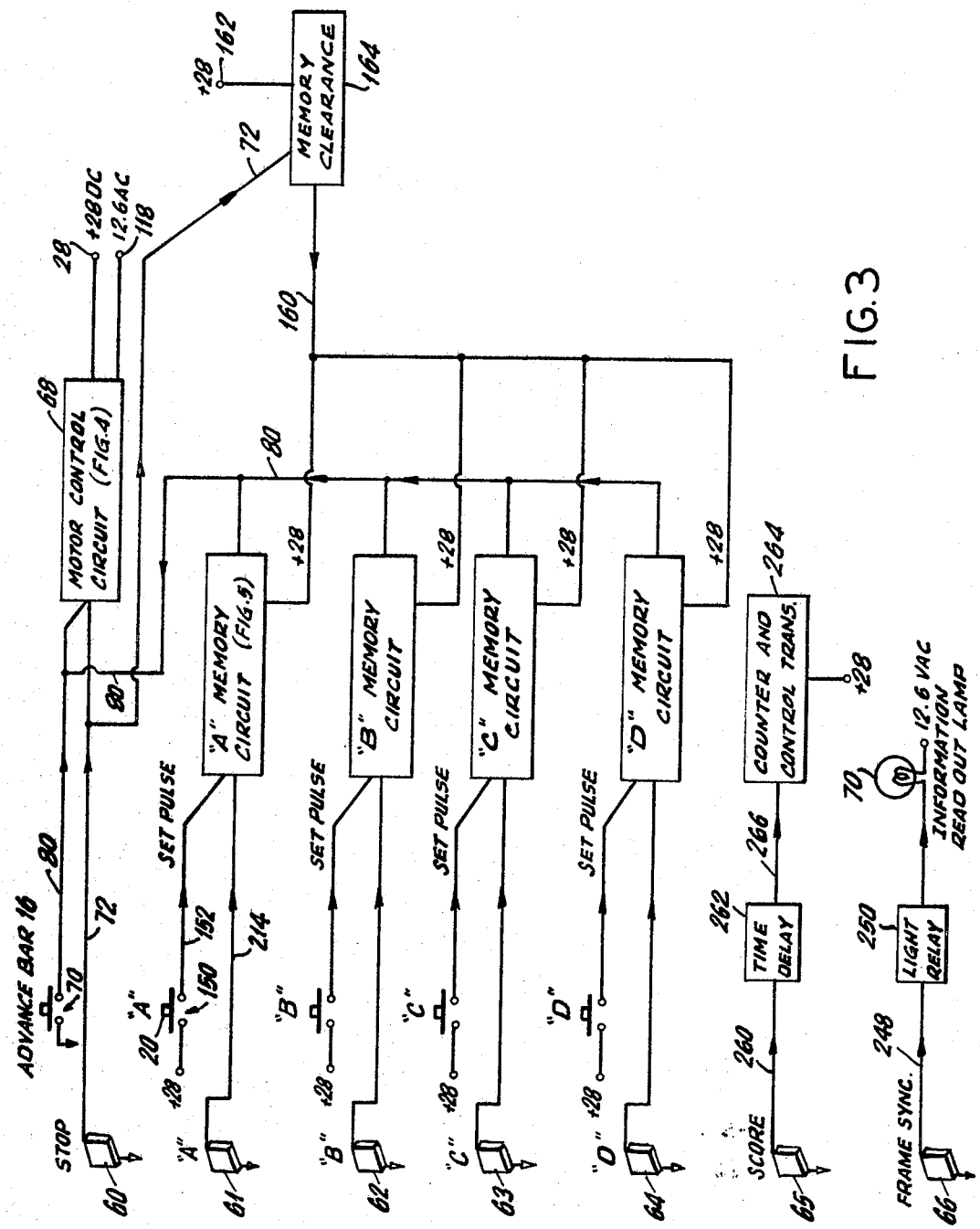
FIG. 3 is an electrical block diagram of the electrical system employed in the device of FIG. 1.

FIG. 3 illustrates the electrical system in block form, of the self-training device 10.

Figure 4:
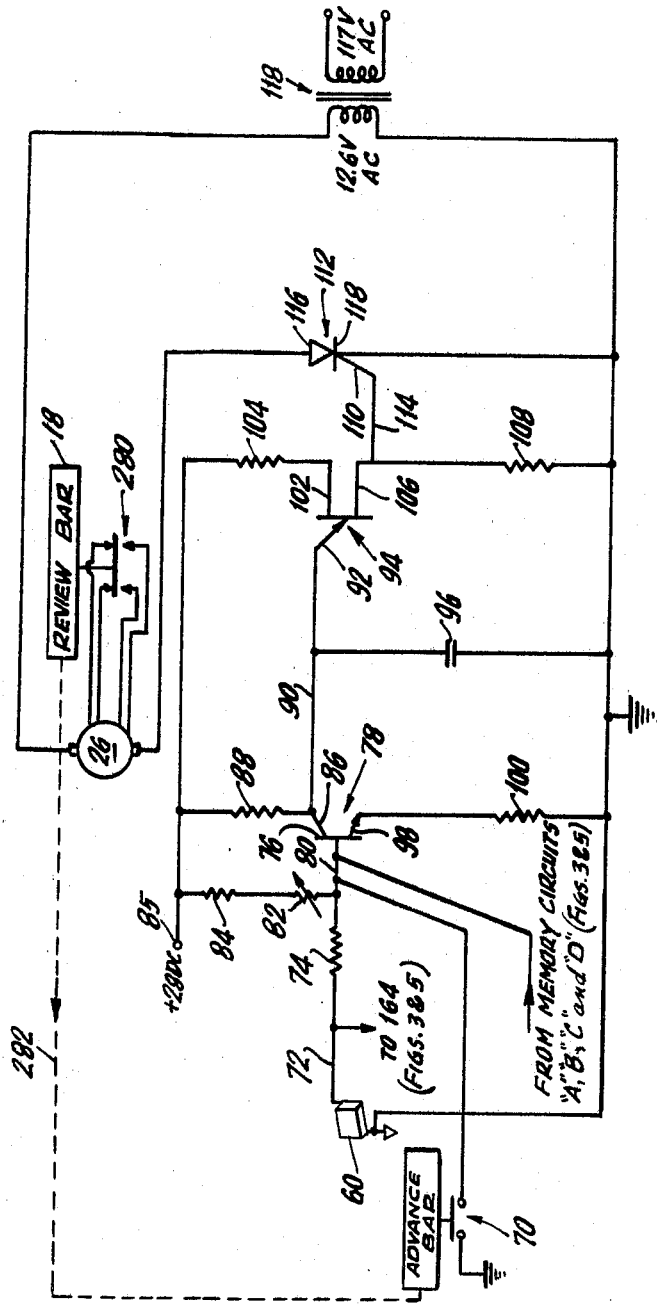
FIG. 4 is a schematic circuit diagram of the motor control circuit portion of FIG. 3 which is associated with the ADVANCE bar and illustrates how the apertures in the film strip of FIG. 2 are detected with photoelectric cells to start and stop the movement of the film strip.

FIG. 4 is a schematic diagram of the Motor Control Circuit 68 of FIG. 3 as connected to photoelectric cell 60 and the ADVANCE bar 16, the latter actuating a switch 70 one contact of which is grounded. One side of the photoelectric cell 60 is connected by a lead 72 to one side of a resistor 74. The other side of resistor 74 is connected to a base electrode 76 of a transistor 78, for instance type 2N1613, by a lead 80, the latter lead also being connected to the undergrounded side of the ADVANCE bar switch 70 and to memory circuits "A," "B," "C" and "D" (see FIGS. 3 and 5). Lead 80 is connected to a variable resistor 82 and a fixed resistor 84 to a DC source 85, say plus 28 volts DC. A collector element 86 of transistor 78 is connected through a resistor 88 to the DC supply 85 and, by a lead 90, to the emitter electrode 92 of a uni-junction type transistor 94, for instance type 2N1671A. Lead 90 is also connected to ground potential through a capacitor 96 while an emitter electrode 98 of transistor 78 is also connected through a resistor 100 to ground potential. The input circuit of transistor 78 is completed by grounding one side of photoelectric cell 60. Base 2 electrode 102 of the uni-junction transistor 94 is connected to the DC source 85 through a resistor 104. Base 1 electrode 106 of uni-junction transistor 94 is connected through a resistor 108 to ground. Base 2 electrode 106 of 94 is also connected to a gate electrode 110 of a silicon controlled rectifier 112, say type 2N1770 by a lead 114. The anode electrode 116 of rectifier 112 is connected to a 60 cycle AC source 118 through motor 26 which is a DC motor, while the cathode 118 of rectifier 112 is connected to the other side of AC source 118 so that the rectifying electrodes 116, 118 are in series with the DC motor 26 to the AC source 118. Variable resistor 82 is adjusted so that the DC motor 26 runs with no light reaching photoelectric cell 60 (when an opaque portion of the film strip 12 is between light source 70 and photoelectric cell 60).

When the film strip 12 is moved by motor 26 so that light from 70 impinges upon photoelectric cell 60 through aperture 50, the voltage generated by 60 as applied to the base electrode 76 of transistor 78 will cause the latter, acting as a switching transistor, to saturate and conduct maximum current through output resistor 88. The voltage drop across 88 reduces the voltage supplied to emitter electrode 92 of the uni-junction transistor 94, the latter acting as a relaxation oscillator having a frequency as determined by capacitor 96 connected in series with resistor 108, the output frequency of 94 increasing and decreasing with increasing and decreasing potential on lead 90. With the frequency of the voltage applied by transistor 94 to the gating electrode 110 of silicon controlled rectifier 112 decreasing as a consequence of light impinging upon photoelectric cell 60, the number of similar polarity voltages upon 110 (as supplied by transistor 94) and upon anode 116 (as supplied by AC source 118) decreases and thereby the power supplied to motor 26 is decreased. Using the proper circuit parameters will cause motor 26 to stop when light passes aperture 50 to photocell 60. Conversely, when light from source 70 does not reach photocell 60 through aperture 50, switching transistor 78 is cut off and the voltage on lead 90 rises so that the number of pulses supplied by the uni-junction transistor 94 upon gating electrode 110 increases to approximately between 1000 to 2000 cycles per second and thereby the increased number of similar polarity voltages upon electrodes 110 (at a frequency of between 1000 to 2000 cycles per second) and 116 (at a frequency of 60 cycles per second) increases so that the DC motor 26 produces its maximum torque and maximum speed, the DC current for motor 26 being derived from the action of the silicon controlled rectifier 112 in series therewith as connected to the AC source 118. The rectification in 112 being half wave, the voltage output to motor 26 drops to zero during negative polarity waves of the 60 cycle scource 118 and also when the cycle polarity of the higher frequency waves supplied by transistor 94 is opposite in polarity to the polarity on gate electrode 110 required for conduction through controlled rectifier 112. Accordingly, the torque of motor 26 varies in direct relationship to the frequency of 94 and in an inverse relationship to the quantity of light impinging upon photocell 60.

As shown in FIG. 2, apertures 50 to 58 are preferably diamond shaped transparent portions in the film strip 12. Accordingly, as any aperture approaches its associated photoelectric cell, the light impinging on such photoelectric cell is gradually, rather than abruptly, increased from zero to a maximum value as a consequence of the V-shaped approaching front of the aperture. Such relatively gradual increase in light causes the torque of motor 26 to change at approximately the same rate that the light reaching the photocell changes. As a result, the changes in the speed of motor 26 are not abrupt, but rather made more gradual because of the diamond shaped apertures. Such desirable elimination of abrupt changes in the motor speed also occurs when the film strip is run backwards by the depression of the REVIEW bar 18 since the diamond shaped apertures are symmetrical about its transverse axis.

The memory circuits associated with photoelectric cells 61, 62, 63 and 64 for the "A," "B," "C" and "D" RESPONSE buttons are similar and FIG. 5 will illustrate such memory circuit associated with photo cell 61 and "A" RESPONSE button 20.

Referring to FIG. 5, a switch 150, one side of which is connected to a DC source, say 1.5 volts, is actuated by "A" button 20. The other side of switch 150 by lead 152 is connected through a diode 153, say type 1N4009, to the control electrode 154 of a gating type rectifier (silicon controlled rectifier) 156, such as type C6U. The anode electrode 158 of rectifier 156 is connected to a DC bus bar 160 through a resistor 162. DC bus bar 160 is energized from DC source 163, say plus 24 volts DC, by an electronic relay 164 of a conventional design, the equivalent elements of which are shown as incorporating a relay coil 166 which actuates a pair of contacts 168 in series between DC source 163 and DC bus bar 160. Coil 166 is energized from lead 72 (see FIG. 4) when light from 70 strikes photocell 60 in aperture column 40.

DC bus bar 160 is connected to the anodes 170 and 172 of gating type (silicon controlled) rectifiers 174 and 176, for instance type C6U, through resistors 178 and 180, respectively. Cathode electrodes 182, 184 and 186 of rectifiers 156, 174 and 176, respectively, are connected to a lead 188, lead 188 being connected to the other side 163' of DC source 163 by a lead 190 through a choke coil 192. Anode electrodes 158 and 170 are connected to lead 190 through capacitors 194 and 196, respectively. Anode electrode 158 is also connected through a resistor 198 and a capacitor 200 to the control electrode 202 of rectifier 174, control electrode 202 also being connected to lead 188 through a resistor 204. Also, anode electrode 170 is connected through a resistor 206 and a capacitor 208 to a control electrode 210 of gating rectifier 176, electrode 210 being connected to lead 188 through a resistor 212. Anode electrode 172 of gating rectifier 176 is connected to lead 80 (see FIGS. 3 and 4) of the motor control system.

Photoelectric cell 61 disposed in aperture column 41 and associated with the "A" button 20 has one side grounded and the other side connected by a lead 214 to the anode sides of diodes 216 and 218, for instance, of the type iN4009. The cathode side of diode 216 is connected through a capacitor 220, a resistor 222 and a capacitor 224 to the lead 190 which is the negative DC supply. The cathode electrode of diode 218 is connected to the control element 210 of the gating rectifier 176.

The memory system as shown in FIG. 5 for the "A" button and its associated photoelectric 61 can be characterized as a "Two-Digit Ring Counter" which is "set" when the "A" button 20 is pressed. The first impulse on lead 152 from switch 150 sets the counter. The second impulse on lead 214 from the associated photocell 61 causes the counter to put a pulse into the motor control system by way of lead 80 which will stop the motor 26 when frame 32 is projected in its stopped position upon screen 14. This occurs when light from source 70 passes through aperture 52 and upon photoelectric cell 61. Should there be a series of "A" explanation frames, as is the case with frames 32 and 32' in FIG. 2, the motor control system of FIG. 4 will continue to index such "A" frames by successive pressings of the ADVANCE bar 16 until the last explanation frame of the series, in this case frame 32', is reached. The next depression of the ADVANCE bar will energize motor 26 to move the film strip 12 but since an aperture will next appear in aperture column 40 before another "A" aperture 52 will appear in the aperture column 41, a signal from photoelectric cell 60 on lead 72 will precede a signal on lead 214 from photoelectric cell 61. The signal on lead 72 will actuate electronic relay 164 so that the DC supply voltage on terminal 163 will be taken off DC bus bar 160 and the memory system of FIG. 5 will be "cleared" and therefore insensitive to apertures in aperture column 41 until the "A" button 20 is again depressed.

As explained herein before, the memory system circuitry for "B," "C" and "D" buttons 20', 20'' and 20''' are similar to the circuitry for the "A" button 20 as schematically shown in FIG. 5.

The purpose of photoelectric cell 66 in aperture column 46 and the apertures 59 in each of the film frames as shown in FIG. 2 will now be explained. Since many of the film frames may have a preponderance of light passing areas in relation to opaque areas, there will occur instances whereby a previously "set" memory circuit (see FIG. 5), as when the "A" bar 20 is pressed, will be sensitive to the light passing through the projectable portion of film frames and will read such light passing areas as the stop signal which should come from light source 70 through apertures 50 to 58. Such error signals will, of course, stop the film strip 12 at the wrong frame. To prevent such error signals, photoelectric cell 66 and apertures 59 are provided for "frame sinc" control. As shown in FIG. 3, voltage generated by photocell 66 is conducted by a lead 248 to a light relay 250 which controls the application of energy to lamp 70 (also see FIG. 2) which supplies illumination for all the photoelectric cells 60 to 65. Hence, lamp 70 is energized only when each frame is in a projectable position upon screen 14. That is to say, lamp 70 is not illuminated in the time interval when the film strip is moving between successive frame positions but is energized for each frame position in its projectable position. Hence, the large light passing areas in the informational portions of the frames cannot reach any of the photocells 60 to 65. So as to make the "frame sinc" operable, light 251 from a constantly illuminated light source 252, which is preferably a separate lamp but may be the usual film strip projection lamp, is directed to exclusively coact with apertures 59 and photocell 66.

When the student correctly answers a question, as for instance presses the "B" bar 20' as shown in FIG. 2, light from lamp 70 when frame 36 is in a projectable position upon screen 14 (as energized by photocell 66 and aperture 59) will pass through aperture 38 and impinge upon photocell 65 (see FIGS. 2 and 3). The signal generated upon lead 260 as delayed by say approximately one-half second in time delay circuit 262 (conventional design and hence not detailed) will serially index a conventional counter 264 through lead 266 so that each student will have an automatic score of correct answers after attempting a series of problems and questions. Such counter 264 is of conventional design which is operated by single pulses and which has a manual reset.

It will be noted that an advanced student has the option of not wasting time reading the explanation in frame 36 as to why his answer is correct and that such an advanced student can immediately go on to the next problem and questions by pressing the ADVANCE bar 16 after he sees the correct score counter advance. The one-half second delay as provided by 262 is desirable as a matter of good physical tempo.

The pressing of the REVIEW bar 18 actuates a switch 280 which conditions motor 26 to be operable in a reverse direction by reversing the field connections thereto in a conventional manner. One-way conventional mechanical linkage 282 is provided between the REVIEW bar 18 and the ADVANCE bar 16 so that pressing the REVIEW bar 18 will depress the ADVANCE bar 16, but not visa-versa.

The self-training device as explained with references to FIGURES 1 to 5 can also be used for true-false type questions and answers. When the film strip 12 is so programmed, actuation of TRUE button 22 can mechanically (not shown) also actuate button "A" by conventional mechanism. Also, actuation of FALSE button 24 can also mechanically actuate button "B." Referring to FIG. 2, the "A" response can then be the TRUE answer on frames 32 and 32' while the FALSE answer can be shown on frame 36. As shown in FIG. 2, the correct answer to the question would then be FALSE.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

What is claimed is:

1. A self-training device which comprises a movable film strip having a question frame and a plurality of response frames, motor means for longitudinally moving said film strip, an aperture in said question frame, an aperture in said response frames, said response apertures being spaced laterally across the film strip and from the question frame aperture, a question aperture detector and a plurality of response aperture detectors in juxtaposition to said film strip and arranged in a lateral direction thereacross, each aperture detector being positioned in the path of one of said apertures as the film strip is moved longitudinally by said motor means, an advance switch, a plurality of response switches, a first circuit coupled to said question aperture detector and to said advance switch for activating said motor means to move said film strip longitudinally until said question frame aperture is detected by said question frame aperture detector, a memory circuit for each of said response switches which is coupled to one of said response aperture detectors for activating said motor means when a selected response switch is closed to move said film strip longitudinally until the aperture in the response frame corresponding to said selected response switch is detected by its corresponding response frame detector, a correct score aperture in a selected one of said response frames, a correct score aperture detector which coacts with said correct score aperture after the response switch corresponding to the response frame having said correct score aperture is activated, and a correct score means coupled to said correct score detector.

2. A self-training device according to claim 1 wherein said memory circuit after being activated by its associated switch for controlling said motor means to move said film strip also controls said motor means to stop said film strip for visually displaying the frame corresponding to the switch which is activated.

3. A device according to claim 1 wherein said motor means is a D.C. motor and said first circuit includes means coupled to the question aperture detector for generating an alternating voltage whose frequency depends upon the degree of detection between said question frame aperture and said question aperture detector, and a rectifier connected in a series circuit with said D.C. motor which is adapted to be connected to an A.C. source, said rectifier having a control element which is coupled to the output side of the variable frequency means.

4. A device according to claim 3 including a light source and wherein said question aperture is a diamond shaped transparent portion of said film strip, said question aperture detector includes a question photocell and the frequency of said alternating voltage generating means decreases with increasing light impinging from said light source through said diamond shaped question aperture and upon the question photocell, whereby the speed of said film strip is decreased as the diamond shaped question aperture progressively passes between said light source and said question photocell.

5. A device according to claim 3 wherein each of said memory circuits is coupled to the input side of the variable frequency voltage generating means.

6. A device according to claim 5 wherein each of said memory circuits has means for placing said variable frequency voltage generating means in a high frequency state upon depressing its associated response switch and in a low frequency state when thereafter its associated response aperture detector detects its associated response aperture.

7. A device according to claim 4 wherein each of said memory circuits is coupled to the input side of the variable frequency voltage generating means, each of said response aperture detectors includes a response photocell which coacts with said light source, and each of said response apertures is a diamond shaped transparent portion of said film strip.

8. A device according to claim 11 wherein said memory circuit is adapted to be connected to a memory circuit power source and includes an electronic relay between said memory circuit power source and each of said memory circuits, said electronic relay being controlled by said question frame detector whereby the first question frame after the last one of said more than one response frames will disable all of said memory circuits.

9. A device according to claim 6 wherein each of the frames of said film strip has a frame sinc aperture and said light source is adapted to be connected to an illuminating power source including a frame sinc aperture detector in the path of movement of said film strip by said motor means and switch means controlled by said frame sinc aperture detector coupled between said illuminating power source and said light source.

10. A device according to claim 9 wherein said frame sinc aperture detector is a frame sinc photocell and including another light source for coacting with said frame sinc detector.

11. A self-training device according to claim 1 wherein each of said response aperture detectors has associated therewith more than one response frame and wherein each memory circuit has means coupled to said advance switch for successively displaying said more than one response frames upon successive closings of said advance switch, the next closing of said advance switch moving said film strip to the next question frame.

(References on following page)

References Cited

UNITED STATES PATENTS

| | | | |
|---|---|---|---|
| 2,402,162 | 6/1946 | Holt | 35—9 |
| 3,100,351 | 8/1963 | Priednieks | 35—9 |
| 3,344,534 | 10/1967 | Anschütz et al. | 35—9 |
| 3,355,818 | 12/1967 | Whitehorn | 35—9 |
| 3,355,819 | 12/1967 | Hannah et al. | 35—9 |
| 3,383,781 | 5/1968 | Duizet | 35—9 |
| 3,395,464 | 8/1968 | Leslie et al. | 35—9 |
| 3,408,749 | 11/1968 | Brudner | 35—9 |

EUGENE R. CAPOZIO, Primary Examiner

W. W. NIELSEN, Assistant Examiner